United States Patent [19]

Falk

[11] Patent Number: 4,928,763
[45] Date of Patent: May 29, 1990

[54] METHOD OF TREATING A PERMEABLE FORMATION

[75] Inventor: David O. Falk, Denver, Colo.

[73] Assignee: Marathon Oil Company, Findlay, Ohio

[21] Appl. No.: 331,486

[22] Filed: Mar. 31, 1989

[51] Int. Cl.⁵ ............... F21B 33/138; F21B 43/32; F21B 47/00
[52] U.S. Cl. .................. 166/250; 166/50; 166/285; 166/295; 166/300
[58] Field of Search ............... 166/50, 250, 285, 292, 166/295, 300

[56] References Cited

U.S. PATENT DOCUMENTS

| 3,056,288 | 10/1962 | Perry | 166/292 X |
|---|---|---|---|
| 3,447,608 | 6/1969 | Fry et al. | 166/295 X |
| 3,482,635 | 12/1969 | Pasini | 166/305.1 |
| 3,615,794 | 10/1971 | Nimerick | 166/294 X |
| 3,785,437 | 1/1974 | Clampitt et al. | 166/281 |
| 3,921,733 | 11/1975 | Clampitt | 175/65 |
| 3,938,594 | 2/1976 | Rhudy et al. | 166/308 |
| 4,018,286 | 4/1977 | Gall et al. | 166/295 |
| 4,137,182 | 1/1979 | Golinkin | 252/8.551 |
| 4,157,116 | 6/1979 | Coulter | 166/294 X |
| 4,190,109 | 2/1980 | Barton, Jr. | 166/270 |
| 4,290,485 | 9/1981 | Free et al. | 166/281 |
| 4,343,363 | 7/1982 | Norton et al. | 166/281 |
| 4,390,067 | 6/1983 | Willman | 166/50 X |
| 4,436,165 | 3/1984 | Emery | 166/50 X |
| 4,444,265 | 4/1984 | Schmidt | 166/50 X |
| 4,494,606 | 1/1985 | Sydansk | 166/295 |
| 4,703,799 | 11/1987 | Jennings, Jr. et al. | 166/50 X |
| 4,722,397 | 2/1988 | Sydansk et al. | 166/50 X |

Primary Examiner—George A. Suchfield
Attorney, Agent, or Firm—Jack L. Hummel; Rodney F. Brown; Jack E. Ebel

[57] ABSTRACT

A method of preventing intrusion of fluid into a horizontal well bore. A quantity of liquid composition capable of gelling and containing a breaker is introduced into a horizontal well bore up to a point corresponding to the bottom of the intrusion zone. After the liquid composition gels into a temporary gel, a second liquid composition capable of gelling into a permanent gel is introduced into the zone to shut off fluid flow from the zone. The temporary gel prevents flow of the permanent gel into the horizontal well bore. Thereafter the breaker in the temporary gel causes the gel to revert to a liquid, which is removed from the horizontal well bore upon production of the well.

10 Claims, 2 Drawing Sheets

METHOD OF TREATING A PERMEABLE FORMATION

FIELD OF THE INVENTION

This invention relates to a method of treating a permeable formation in connection with a subterranean oil recovery process. More particularly, it relates to a method of treating a permeable formation adjacent a horizontal well bore.

BACKGROUND OF THE INVENTION

In order to obtain maximum production from an oil well which has been producing fluid containing a high percentage of water, horizontal well bores extending transversely from the vertical well bore are sometimes drilled. Because they extend into oil-producing formations above the source of the water, oil production is increased.

The concept of horizontal well bores goes back many years. It had been theorized for some time that they would have a beneficial effect on oil wells whose production had fallen below an acceptable level. It has been only relatively recently, however, in the last ten years or so, that the technology needed to drill horizontal well bores has been developed. This has involved the use of computer controlled drilling operations employing gyroscopes to maintain the drilling heads at the proper angle. In general, the drill is caused to enter the surrounding formation at a shallow angle to the vertical bore and is moved along an arcuate path until it reaches a point which is approximately at the same level as the point of entry. Because the radius of the arc is large, the newly drilled transversely extending bore is referred to as a horizontal well bore because it extends in a generally horizontal direction. To cause the drill bit to enter the formation at the proper angle and at the desired point along the length of calculated to be that which will cause the drill, upon contacting the whipstock, to be directed toward the wall of the vertical well bore at the correct angle.

It is of course desirable to avoid drilling into any area or zone which will cause gas or water to flow into the horizontal bore. Therefore, if sufficient information about the location of gas zones or aquifers exists, and if the drilling operation is properly controlled, a horizontal well bore can be provided which will avoid such areas. Even if a gas zone or aquifer is accidentally or mistakenly penetrated during the drilling operation, as long as it is discovered prior to removing the drilling tool and beginning production the formation can be plugged at the proper location by known techniques. In either case subsequent oil production will not contain excessive amounts of gas or water.

If, on the other hand, a horizontal well bore is drilled and production is begun without knowledge of an intrusion zone that subsequently causes unacceptable amounts of gas or water to enter the horizontal well bore, steps have to be taken to close off the area of breakthrough. To plug the permeable formation by known means would result in the plugging composition lodging in the horizontal well bore. Because the drilling equipment once removed cannot normally be returned to its exact previous location, it is extremely difficult to drill out plugging material from the horizontal well bore. What is needed is a method of shutting off the breakthrough of gas or water without requiring subsequent drilling and without plugging the horizontal well bore.

SUMMARY OF THE INVENTION

In the practice of the invention the transverse bore which forms a horizontal well bore is temporarily blocked below the intrusion zone. Plugging material is then introduced into the zone to permanently block fluid flow from the zone into the transverse bore, after which the temporary blockage of the transverse bore is removed. Preferably the temporary blockage is caused by introducing into the transverse bore a liquid composition capable of gelling, and allowing the liquid composition to gel. The blockage is then removed by causing the gel to revert to fluid form, as by including a breaker in the gel composition, and producing the well. The plugging material, which is an initially flowable composition that gels and remains in place to prevent breakthrough, preferably is a permanent gel.

In filling the transverse bore with the fluid composition to temporarily prevent flow through the bore, it is necessary to fill the bore substantially to a level corresponding to the bottom of the intrusion zone so that when the permanent plugging material is introduced to the zone it will not fill the transverse bore.

A gas or water breakthrough can thus be sealed off from a horizontal well bore without the need for further drilling simply by the introduction of two different types of fluid compositions in accordance with the invention.

DESCRIPTION OF THE PREFERRED EMBODIMENT

Figure 1:
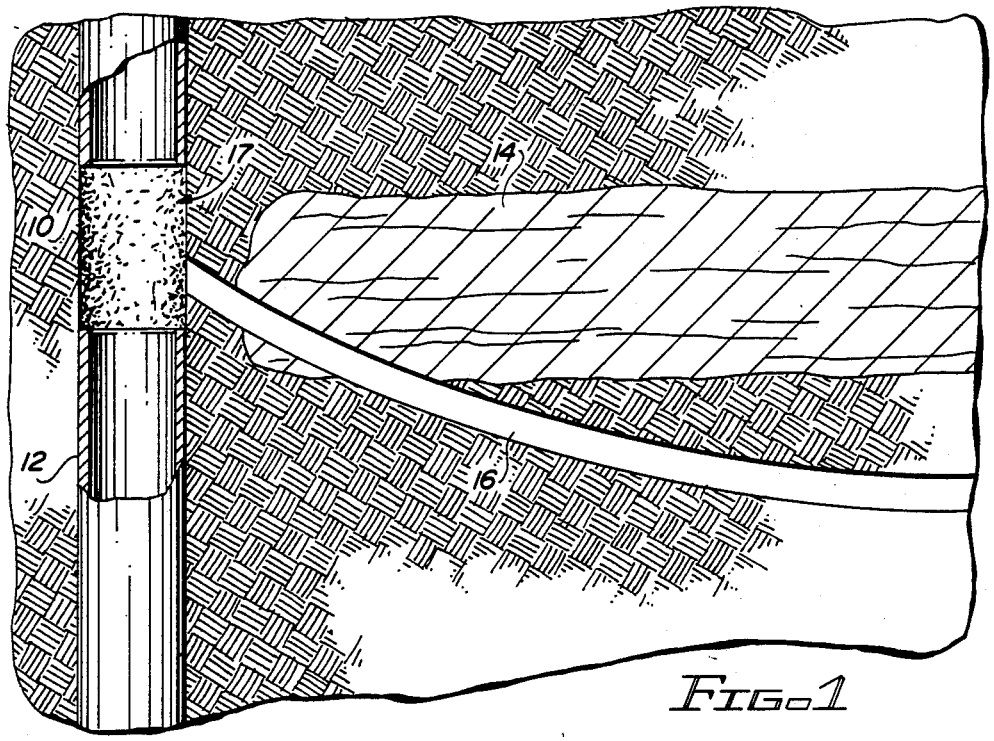
FIG. 1 is a partial schematic view of a horizontal well bore arrangement wherein the transverse bore extending from the vertical well bore penetrates a gas cap.

Referring to FIG. 1, the vertical well bore 10 in which a casing 12 has been installed can be seen to penetrate a gas cap 14. Because the gas cap is situated above the normal producing region of the well it would not normally affect the production fluid entering the casing 12. In the arrangement shown, however, a horizontal well bore 16 has been drilled in order to improve the production of the well, and the upper portion of the bore 16 penetrates the gas cap. In the case illustrated, the fact that the bore 16 penetrates the gas cap would not have been realized until production had begun and the presence of unusually high amounts of gas noted. If nothing is done to correct the situation, gas will flow into the bore 16 from the adjacent gas cap 14 and production of the well will include an unacceptably high amount of gas.

In accordance with the practice mentioned previously, the bore 16 will have been drilled along an arcuate path the radius of which is quite large, perhaps in the order of thirty feet or so, in order to permit the drill to exit the vertical bore 10 at an angle which is practical to achieve while at the same time allowing the drill to move along a path designed to take it a substantial distance transversely away from the vertical well bore 10. The drilling process would have been started by underreaming in the area to be drilled, as illustrated in FIG. 1, and deflecting the drill at a predetermined angle into the side wall of the vertical bore 10 by a whipstock, not shown, positioned just below the juncture of the bores 10 and 16.

Figure 2:
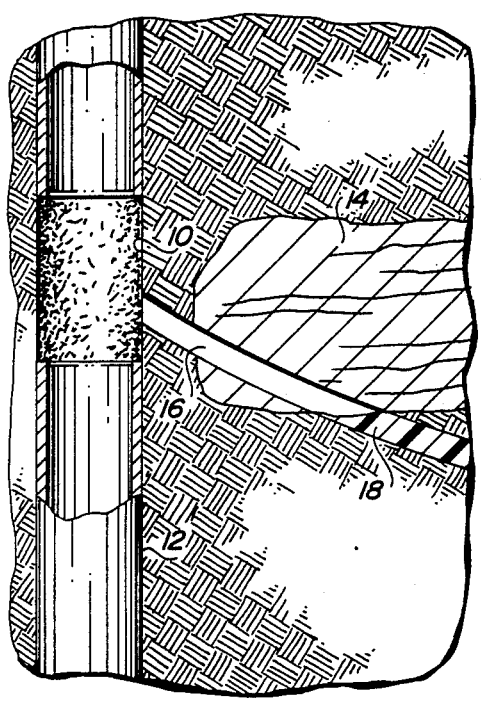
FIGS. 2, 3 and 4 are views similar to that of FIG. 1 showing the steps of the invention in blocking off the horizontal well bore from the gas cap.

The lowermost point of entry in the bore 16 of gas from the gas cap 14 is determined and the volume of the horizontal bore below that point is calculated. As shown in FIG. 2, a volume of suitable liquid composition 18 is then introduced into the horizontal bore 16 so that the upper level of the liquid corresponds approximately to the lowermost point of entry of the gas.

Any suitable gel composition which can be pumped as a liquid and which subsequently crosslinks in place to form a mature gel which is nonflowable and has sufficient strength to withstand the pressures exerted on it can be used. In addition, the gel must be capable of breaking down and reverting to liquid form to permit subsequent production of the permeable formation.

Gels of particular interest are those comprised of a carboxylate-containing polymer crosslinked with a crosslinking agent comprising a chromic carboxylate complex. The carboxylate-containing polymer may be any crosslinkable, high molecular weight, water soluble, synthetic polymer or biopolymer containing one or more carboxylate species. The average molecular weight of the carboxylate-containing polymer is in the range of about 10,000 to about 50,000,000, with the preferred range being about 100,000 to about 20,000,000.

The biopolymers which can be used include polysaccharides and modified polysaccharides. Exemplary biopolymers are guar gum and carboxymethylcellulose. Exemplary synthetic polymers include acrylamide polymers, such as polyacrylamide, partially hydrolyzed polyacrylamide and terpolymers containing acrylamide, acrylate and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any of the well known conventional methods in the art. The preferred carboxylate-containing polymer is polyacrylamide or partially hydrolyzed polyacrylamide.

With respect to the chromic carboxylate complex crosslinking agent, the term "complex" means an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The complex useful as a crosslinking agent includes at least one or more electropositive chromium III species and one or more electronegative carboxylate species. Each complex optionally contains additional species which are not essential to the polymer crosslinking function of the complex, such as one or more water molecules or inorganic monovalent or divalent ions which function merely to balance the electrical charge of the complex.

Trivalent chromium and chromic ion are equivalent terms encompassed by the term "chromium III species" as used herein. The carboxylate species are advantageously derived from water soluble salts of carboxylic acids, especially low molecular weight mono-basic acids. Carboxylate species derived from salts of formic, acetic, propionic and lactic acid, lower substituted derivatives thereof and mixtures thereof are preferred. The carboxylate species include formate, acetate, propianate, lactate, lower substituted derivatives thereof and mixtures thereof, all of which are water soluble. The optional organic ions include sodium, sulfate, nitrate and chloride ions.

The complexes described and their method of preparation are well known in the art. The preferred chromic carboxylate complex for use in this invention is chromic acetate complex.

A preferred gel suitable for use in the invention is one of polyacrylamide or partially hydrolyzed polyacrylamide crosslinked with chromic triacetate. As is well known in the art, these gels can be readily formulated as a low viscosity fluid having a broad range of strengths and gel onset times. For example, 2% polyacrylamide (PA) with chromic triacetate (CrAc) in a ratio of 20 PA:CrAc results in a suitable gel which is stable at 185° F. for a period of more than thirty days. By adding a breaker to the gel composition the gel will break down within a predetermined period of time, reverting to a nonviscous fluid. For example, ammonium persulfate and sodium nitrite, when incorporated in the gel composition in amounts from 1000 to 8000 ppm, broke gels between 20 and 30 days at 75° F. It will be understood that other formulations can be designed to break the gel in much less time, as low as a day, if desired. Thus the particular gel-breaker composition utilized can be selected to suit the time schedule of the project.

As is known in the art, a number of different types of breakers may be used in connection with the gel system described above. In addition to the oxidizing agents mentioned, a number of other oxidizing agents such as sodium persulfate, sodium chlorate, sodium perchlorate and sodium perborate may be used. Other types of breakers which can be employed with the gel system include strong chemical breakers, such as hydrogen peroxide, sodium chlorite, perchloric acid and sodium peroxide; chelating agents, such as oxalic acid, citric acid, sodium tartrate and sodium citrate; and organic chemicals such as methylacetoacetate, ethylacetate, ethylacetoacetate and dichloroacetic acid.

Those skilled in the art of gelation will recognize that other gel systems and associated breakers in addition to those mentioned may be utilized to fill the bore 16 to the desired level and subsequently revert to liquid form.

Figure 3:
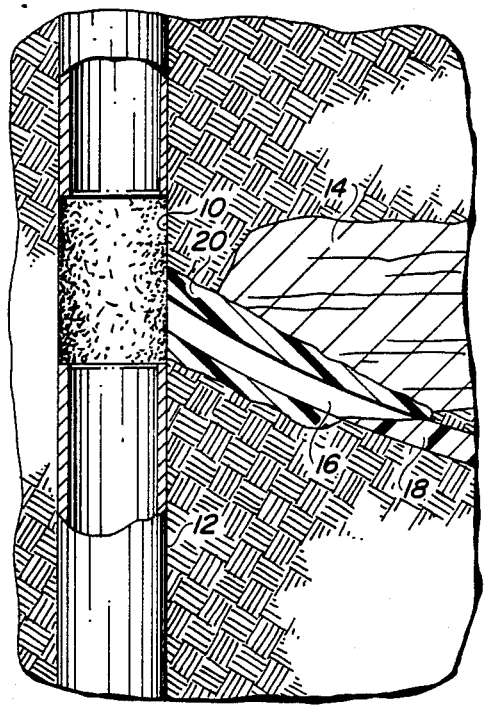
Figure 4:
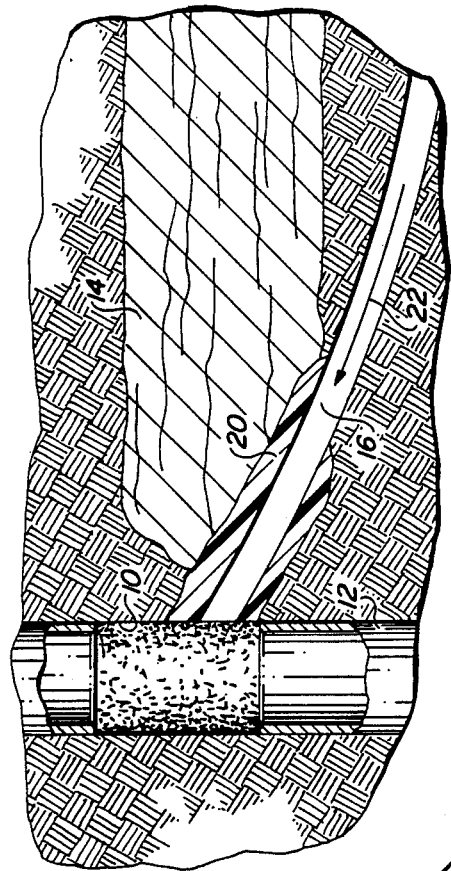

Referring now to FIG. 3, after the liquid composition has gelled into a mature gel a second liquid composition which will gel into a permanent gel is then pumped under pressure into the upper portion of the bore 16 extending between the vertical bore 10 and the upper extent of the gel 18. This permanent gel may be one of the gels mentioned above which does not incorporate a gel breaker. Since it cannot travel into the bore 16 beyond the upper level of the gel 18, the second liquid composition is forced into the permeable formation surrounding the upper portion of the bore 16 as illustrated at 20, where it matures into a permanent gel 20. Since no means have been provided to break the gel, the gel 20 functions to permanently plug the formation and prevent the breakthrough of gas from the gas cap 14 into the bore 16. At some point after the permanent gel 20 has been put into place the breaker incorporated in the temporary gel 18 acts to break down the gel 18 and cause it to revert to liquid form. The well bore 16 is now ready for oil production. When production starts the liquid broken gel flows to the surface, followed by normal oil production of the well, flowing in the direction of the arrow 22 in FIG. 4.

Figure 5:
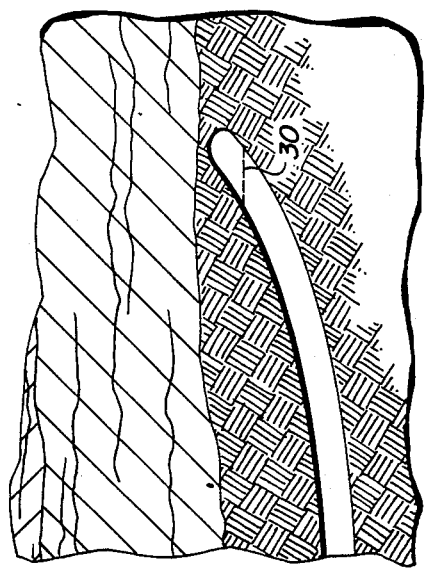
FIG. 5 is a view similar to that of FIG. 4, but showing a horizontal well bore after it has been blocked off from a permeable formation connecting the gas cap to the horizontal well bore.
Figure 5:
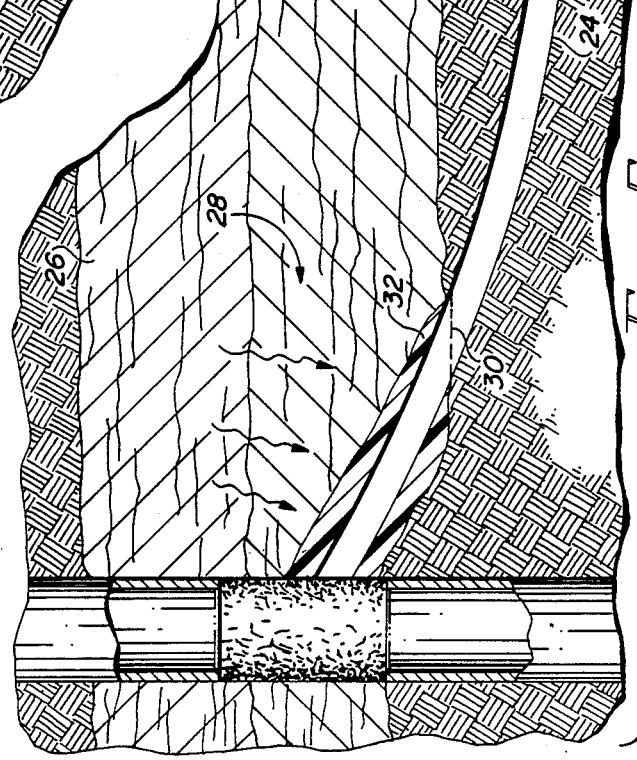

Referring to FIG. 5, in the arrangement shown the upper portion of the horizontal well bore 24 does not itself intersect the gas cap 26 but is located in a permeable formation 28 through which the gas seeps into the upper portion of the bore 24. The method of treating this problem is similar to the method described earlier. The lowest level of entry of the gas into the bore 24 is determined and a liquid composition containing a breaker is introduced into the bore 24 below that level, as indicated by the dotted line 30. The liquid composition will of course fill the arcuate bore 24 up to the same level 30 at the remote end of the bore. Obviously it is not necessary to fill the remote end of the bore 24 entirely, as the amount of the gel formed from the liquid composition after filling the bore to the level 30 is sufficient to block the passage of the permanent gel added thereafter. As in the previous case, after the temporary gel is formed, a liquid composition designed to gel to a permanent mature gel is then forced into the permeable formation 28 surrounding the upper portion of the bore 24. The resulting permanent gel 32 effectively prevents gas from reaching the bore 24. As in the description above, the temporary gel reverts to liquid form and is pumped out when production of the horizontal bore 24 is begun.

It is known that various types of treatment fluids often block or damage formations with which they come in contact, with the undesirable effect of permitting only water to flow through. It is often beneficial, therefore, to apply a so-called "mutual solvent" to the formation prior to subjecting it to the treatment fluid. This preflush treatment can, for example, take the form of a slug of matching reservoir crude oil or diesel of perhaps 1-4 barrels in volume. This would be followed by the introduction of the appropriate amount of the liquid composition which subsequently gels to form a temporary gel.

Although the method of this invention has been described in connection with the sealing of a horizontal bore against the entry of gas from a gas cap, it will be understood that it will have equal applicability in connection with sealing a horizontal bore against the entry of water. This situation can occur when the horizontal bore intersects an aquifer or intersects a porous formation through which water from a nearby aquifer is flowing. In either case the same principles of the invention apply.

It will be understood that while the invention has been described in connection with a horizontal bore which extends from an existing vertical well bore, it need not be limited to that specific arrangement. It can just as well be used in connection with a horizontal well bore drilled from a new vertical well bore, in which event the vertical well bore would be still uncased prior to drilling the horizontal bore.

It will now be appreciated that the method of this invention allows an apparently permanently flawed horizontal well bore operation to be rescued by steps which are relatively inexpensive and rapid to carry out. The method does not involve further drilling but merely the sequential introduction of fluids. Moreover, it is highly effective, providing permanent plugging of the offending formation so as to permit continuous oil production through the horizontal well bore.

It should now be understood that the invention is not necessarily limited to all the specific details described in connection with the preferred embodiment, but that changes to certain features of the preferred embodiment which do not affect the overall basic function and concept of the invention may be made by those skilled in the art without departing from the spirit and scope of the invention, as defined in the appended claims.

What is claimed is:

1. In an oil well having a vertical wall bore and a transverse bore extending therefrom, a method of permanently plugging a zone intersected by the transverse bore to prevent fluid flow from said zone into the transverse bore, comprising the steps of:
    temporarily blocking the transverse bore against fluid flow therethrough at a location below said zone, subsequent to all drilling equipment being removed from said vertical well bore and said transverse bore;
    introducing plugging material into said zone to permanently block fluid flow from said zone into the transverse bore; and
    removing the temporary blockage from the transverse bore to permit fluid flow through the transverse bore and into the vertical bore.

2. A method according to claim 1, wherein the transverse bore is temporarily blocked by introducing into the transverse bore a liquid composition capable of gelling and allowing the liquid composition to gel, and wherein the temporary blockage is removed by causing the gel to revert to a liquid.

3. A method according to claim 2, wherein the plugging material is a liquid composition which gels to a permanently mature state in said zone.

4. A method according to claim 2, wherein the gel of the temporary blockage is caused to revert to a fluid by including a gel breaker in the fluid composition.

5. A method according to claim 4, wherein the gel comprises a carboxylate-containing polymer crosslinked with a chromic carboxylate complex crosslinking agent.

6. A method according to claim 5, wherein the polymer is an acrylamide polymer.

7. A method according to claim 6, wherein the polymer is a polymer selected from the group consisting of polyacrylamide and partially hydrolyzed polyacrylamide, and the crosslinking agent comprises a chromic acetate complex.

8. A method according to claim 2, wherein the transverse bore is filled with the liquid composition substantially to a level adjacent said zone.

9. A method according to claim 8, including the step of determining the volume of the transverse bore below the bottom of said zone, the amount of liquid composition introduced into the transverse bore substantially corresponding to such volume.

10. In an oil well having a vertical well bore and a transverse bore extending therefrom, a method of preventing intrusion of fluid into the transverse bore from a zone intersected by the transverse bore, comprising the steps of:
    determining the volume of the transverse bore below the bottom of said zone;

introducing into the transverse bore a quantity of a first liquid composition capable of gelling, the quantity of said first liquid composition being sufficient to fill the transverse bore substantially to the bottom of said zone, the liquid composition containing a breaker;

allowing the first liquid composition to gel; plugging said zone with a second liquid composition capable of gelling to a permanently mature state over a period of time and allowing the second liquid composition to gel, the gel maturing from the first liquid composition preventing the second liquid composition from entering the transverse bore below the bottom of said zone;

allowing the gel containing the breaker to revert to a liquid; and removing the liquid resulting from the broken gel from the transverse bore.

* * * * *

UNITED STATES PATENT AND TRADEMARK OFFICE
CERTIFICATE OF CORRECTION

PATENT NO. : 4,928,763
DATED : May 29, 1990
INVENTOR(S) : David O. Falk

It is certified that error appears in the above-identified patent and that said Letters Patent is hereby corrected as shown below:

Col. 1, line 39: After "length of" insert --the vertical well bore, a whipstock is placed in the vertical well bore just below the desired entry point. The exact location of the whipstock will have been--.

Col. 6, line 14: Delete "wall" and insert --well--.

Signed and Sealed this

Thirteenth Day of August, 1991

Attest:

HARRY F. MANBECK, JR.

Attesting Officer     Commissioner of Patents and Trademarks